Figure 1:
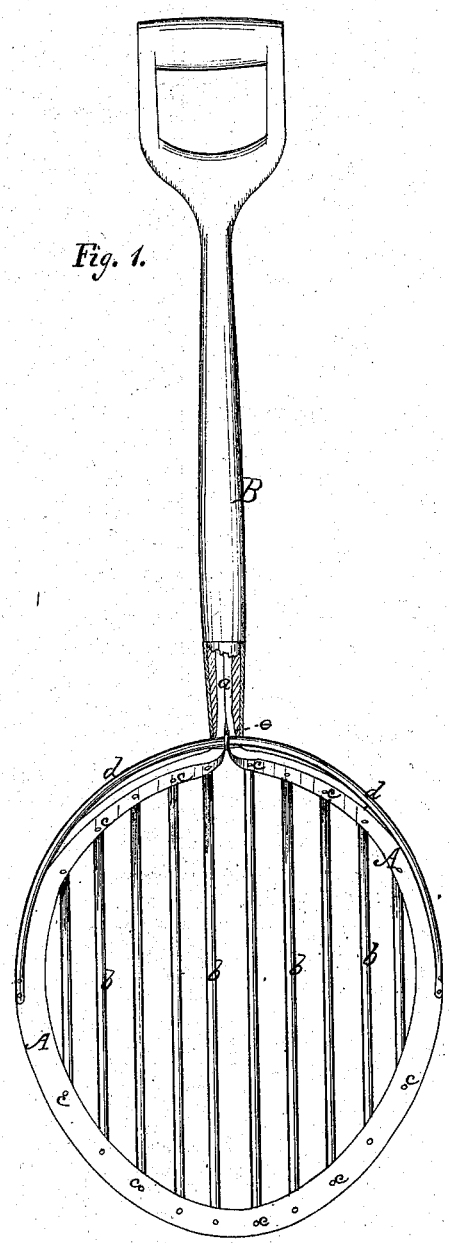

J. F. UNGLISH.
Vegetable-Scoop.

No. 100,822.  Patented Mar. 15, 1870.

United States Patent Office.

JOHN F. UNGLISH, OF WEBSTER, NEW YORK.

Letters Patent No. 100,822, dated March 15, 1870.

IMPROVED VEGETABLE-SCOOP.

The Schedule referred to in these Letters Patent and making part of the same.

I, JOHN F. UNGLISH, of Webster, in the county of Monroe, and State of New York, have invented a certain new and useful Improvement in the Construction of Vegetable-Scoops, of which the following is a specification.

The object of my improvement is to produce a scoop for handling potatoes, and other vegetables and fruits, which may be cheaply made by an ordinary blacksmith, or person skilled in forging iron, and of lighter weight than is required by those made of cast metal.

My improvement consists in the construction of the scoop of wrought iron, with the outer rim or bearing made of a bar that is bent or forged into the proper shape, and the ends brought together and inserted in the end of the handle, in combination with the cross-bars or rods which are welded or otherwise secured thereto, and the guards extending around the sides, substantially as hereinafter set forth.

In the drawings—

Figure 1 is a plan of my improved scoop, and

Figure 2:
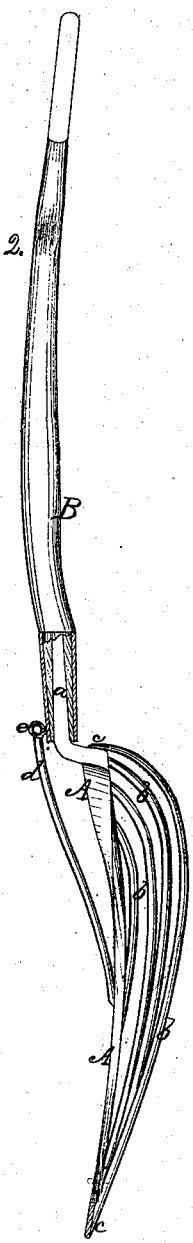

Figure 2 a section of the same in the plane of line $x\ x$, fig. 1.

A indicates the rim or bearing, which is made of a bar of wrought iron, and forged into the shape represented in fig. 1, with its ends brought together so as to form a stem or shank, $a$, which is inserted in a socket in the end of the handle B.

Wrought-iron bars or rods $b\ b$ extend across and are secured to the rim A on opposite sides, at uniform distances apart, by welding or riveting, as shown at $c\ c$, so as to allow the dirt that is scooped up with the vegetables or fruit, to sift through between the bars.

I also provide one or more guards $d$ or railings, which extend part way around the scoop over the rim A, and are welded to it at opposite ends, shown at $e\ e$, and rest midway in an eye or bearing, $g$. These guards serve as a railing to prevent the contents of the scoop from falling off, and allow a greater quantity to be handled at a time.

When the scoop is made of cast metal, it must necessarily be made heavy and cumbersome in order to give it the necessary strength, and then it is very liable to crack or break, and cannot be easily repaired, which make it of but little utility. If it were made of sheet metal its use would be very objectionable, as its sharp edges would cut and bruise the vegetables or fruit.

In my improved device, the parts being forged from wrought-iron bars, they may be of very light weight, and still secure the necessary strength and durability; and also they may be cheaply made by any workman who is skilled in forging iron.

What I claim as my invention, is—

The construction of the scoop of wrought iron, consisting of the rim A provided with the stem or shank $a$, cross-bars $b\ b$, guards $d\ d$, and handle D, and arranged substantially as and for the purpose set forth.

In testimony whereof I hereunto sign my name in the presence of two subscribing witnesses.

JOHN F. UNGLISH.

Witnesses:
    J. A. DAVIS,
    FRED. A. HATCH.